Jan. 30, 1962   H. E. GEIST   3,019,331
ILLUMINATED TABLE
Filed Nov. 16, 1959   2 Sheets-Sheet 2

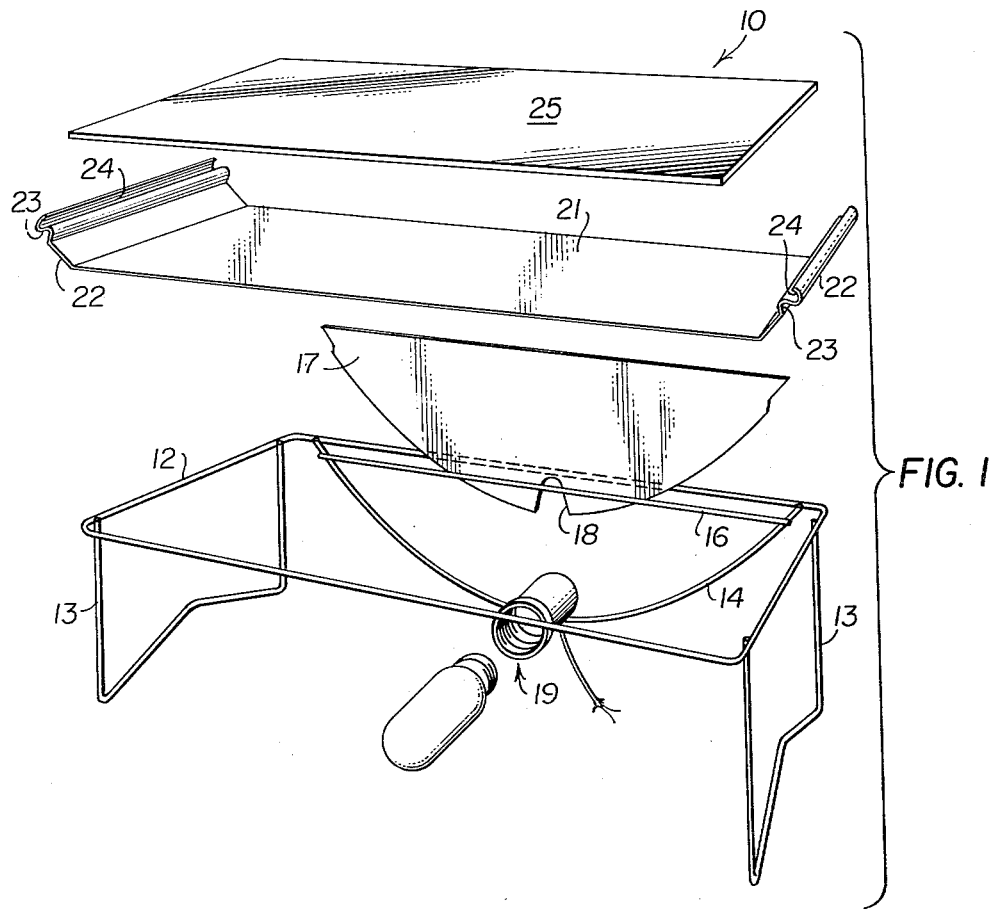
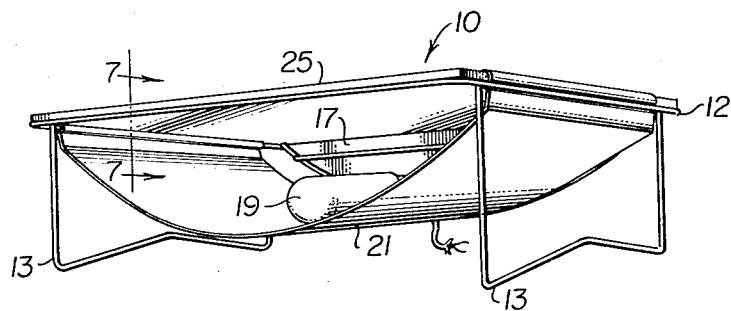

INVENTOR.
HAROLD E. GEIST
BY

United States Patent Office 3,019,331
Patented Jan. 30, 1962

---

3,019,331
ILLUMINATED TABLE
Harold E. Geist, 11820 Edgewater Drive,
Lakewood 7, Ohio
Filed Nov. 16, 1959, Ser. No. 853,095
3 Claims. (Cl. 240—2)

The present invention relates to an illuminated table, and, more particularly, to an illuminated table adapted for use in photography work and related fields.

It is a general object of the invention to provide an easily assembled and inexpensive instrument having a wide number of uses, such as in slide-sorting, opaquing and retouching negatives, tracing, and mimeograph stenciling.

In the specific application of slide-sorting, the invention provides a means for quickly identifying and arranging color slides whereby the long tedious job of sorting slides by holding them one by one up to a window or lamp for identification is eliminated. By use of my table it is possible to make instant, clear and distinct identification of up to 40 slides at a time by projecting light of suitable intensity through a translucent support, the light showing through the subject in color and outline. Rapid selection of such slides for arrangement in a projector magazine, for example, is thus greatly facilitated.

Another object of the invention is to provide a durable and sturdy illuminated table constructed from metal or plastic rods and sheets and which is inexpensive to manufacture and easily assembled.

Many other advantages and objectives of this invention will become readily apparent by referring to the following detailed description in connection with the accompanying drawings wherein:

FIGURE 1 is an exploded view of an illuminated table constructed in accordance with the terms of my invention.

FIGURE 2 is an assembled isometric view of the structure shown in FIGURE 1.

Figure 4:
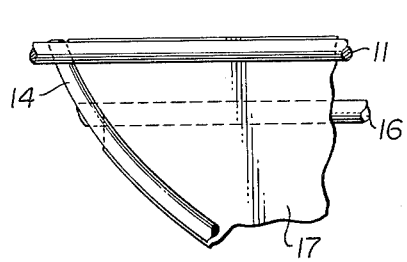
FIGURE 4 is a fragmentary section of the invention taken along the line 4—4 of FIG. 3.

Referring now to the drawings wherein like reference numerals designate like parts throughout the several views, there is shown in FIGURES 1 and 2 a table 10 comprised generally of a support, a light 19, a reflector 21, and a translucent plate 25.

The support includes a rectangular frame 12, having attached legs 13 and an arcute member 14 secured by its arms to one side of the frame. A brace 16 is fastened across the arms of member 14 and is positioned below and parallel to the plane of the frame. Member 14 also has a U-shaped light holder means 15 mounted in an inverted position at the bottom of the arc. In the preferred form, the several parts making up the support consist of small wires or rods which, when joined together, form a rigid integral structure.

Figure 7:
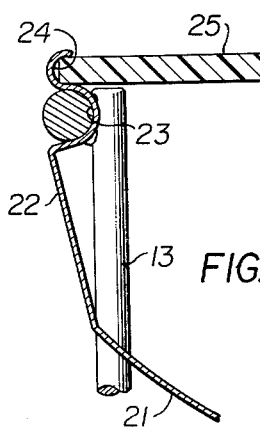
FIGURE 7 is another fragmentary sectional view taken along the line 7—7 of FIG. 2 looking in the direction of the arrows.

The reflector 21 is a thin, flat metal sheet properly painted or coated to enhance its reflecting properties. To facilitate assembly, the ends of the reflector are sloped upwardly at 22 with the terminal portions thereof bent into an S-shape configuration thereby forming an outwardly opening groove 23 and an inwardly opening groove 24. The reflector is substantially greater in length than the frame 12 so that when the two parts are assembled, the reflector will be downwardly bowed into an arcuate shape as shown in FIGURE 2, the reflector being held in place within the ends of frame 12 by means of the grooves 23 which resiliently engage the frame ends as shown in FIGURE 7.

The translucent plate has a length and width substantially equal to the length and width of frame 12 so that the grooves 24 of the reflector legs will rigidly grip the ends of the plate when the reflector is bowed into its assembled position. Preferably, the plate 25 is formed from a rigid piece of glass or translucent plastic material suitable for resisting the heat generated by light 19.

Figure 5:
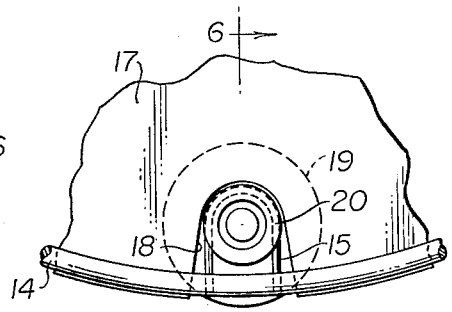
FIGURE 5 shows a fragmentary portion of the invention, partially in section, taken in the plane of line 5—5 of FIG. 3.
Figure 6:
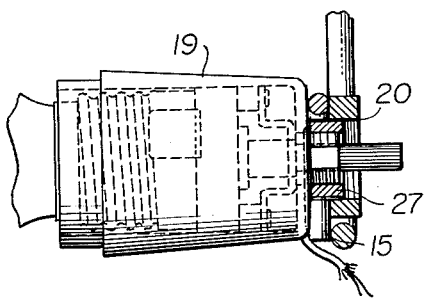
FIGURE 6 is a fragmentary sectional view taken in the plane of the line 6—6 in FIGURE 5.

Referring now to FIGURES 4 and 5, it will be seen that the light 19 has a threaded end portion 27 from which the switch extends. The light is assembled to the support by inserting the end 27 between the legs of the U-shaped holder 15 and then threading on the nut 20. In order that the plate will be illuminated in the most efficient manner by the light, a baffle or end wall 17 is provided for closing off one end of the support. In the form illustrated, the baffle is assembled to the rest of the structure by sliding it between the brace 16 and the side of the frame to which member 14 is attached.

The above-described parts are inexpensive to manufacture, and can be easily and quickly assembled into an illuminating table by the relatively simple steps of first sliding the baffle into place, bowing the reflector so that the grooves 23 of the upturned ends grip the ends of the frame, bolting the light to member 19, and finally sliding the plate into grooves 24.

Figure 3:
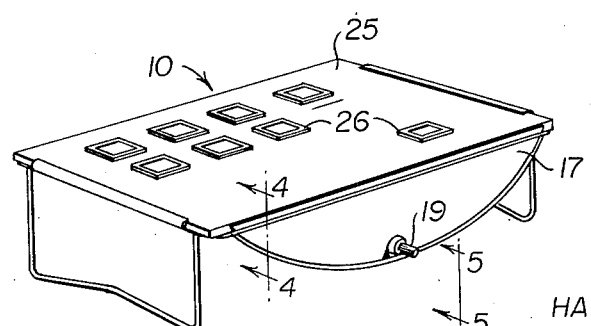
FIGURE 3 shows the illuminated table in use as a slide sorter.

When used as a slide-sorter, as shown in FIGURE 3, the light is turned on and the slides arranged in any desired manner on the plate. The illuminated table provides a simple and yet efficient means by which the slides can be instantly identified, aided by clear color showing, and rapidly sorted for arrangement in a projector magazine. Additionally the table may be used in retouching and opaquing negatives, stenciling or tracing by simply turning on the switch and adjusting the material on the plate.

It should be understood, of course, that the foregoing disclosure relates only to a preferred embodiment of the invention and that it is intended to cover all changes and modifications of the example of the invention herein chosen for the purposes of the disclosure, which do not constitute a departure from the spirit and scope of the invention as defined by the appended claims.

What is claimed is:

1. An illuminated table comprising a support including legs secured to an open rectangular frame, a downwardly bowed reflector within said frame, said reflector having resilient end portions extending part way around and resiliently grasping and pressing against the end members of said frame to hold said reflector in assembled position within said frame, said resilient end portions extending above said frame and bent inwardly to form channels, a rigid translucent plate resiliently embraced at its end edges and held between the end channel portions of said reflector above said frame, and a light secured to said support and positioned between said reflector and said plate.

2. An illuminated table comprising a support including an open rectangular frame having legs depending therefrom, a downwardly bowed, resilient reflector having upturned ends terminating in a generally S-shaped configuration, said reflector being positioned within the frame with a portion of the S-shaped, upturned ends resiliently gripping the frame ends, a flat, rectangular, translucent plate substantially equal in width and length to the frame, said plate resiliently engaged and held between other portions of said S-shaped, upturned ends, and a light fastened to said support and positioned between said reflector and said plate.

3. An illuminated table adapted for use as slide-sorter comprising a support including an open rectangular frame having legs secured thereto, a generally arcuate member having its arms fastened to a side of said frame, said arcuate member being mounted in a concave-up position, a light holder means fastened to said arcuate member, said light holder means being positioned within and at the bottom of the arc formed by the arcuate member, and a brace having its ends fastened to an intermediate portion of the arms of the arcuate member, a rectangular reflector having upturned ends terminating in an S-shaped configuration, each of said terminating ends defining an inwardly opening groove and an outwardly opening groove, said reflector having a length substantially greater than that of the frame and being downwardly bowed into an arcuate form within said frame with said outwardly opening grooves resiliently grasping the inner sides of the frame ends and the bottom of the assembled reflector being spaced below said light holder means, a flat, rectangular, translucent plate substantially equal in width and length to said frame, said plate being held in position between said upturned ends with its ends slidably engaged within said inwardly opening grooves, a light secured to said light holder means and projecting beneath said plate, and a baffle positioned between said brace and said one side of the frame, said baffle being adapted to prevent light from escaping from one side of said support.

References Cited in the file of this patent

UNITED STATES PATENTS

| | | |
|---|---|---|
| 922,958 | Ryan | May 25, 1909 |
| 1,756,289 | Harding | Apr. 29, 1930 |
| 2,090,239 | Strang | Aug. 17, 1937 |
| 2,701,838 | Loesch | Feb. 8, 1955 |
| 2,754,412 | Noguchi | July 10, 1956 |
| 2,806,939 | Montebello | Sept. 17, 1957 |